T. L. BURTON.
BRAKE HANGER.
APPLICATION FILED JUNE 12, 1918.
1,328,315.
Patented Jan. 20, 1920.
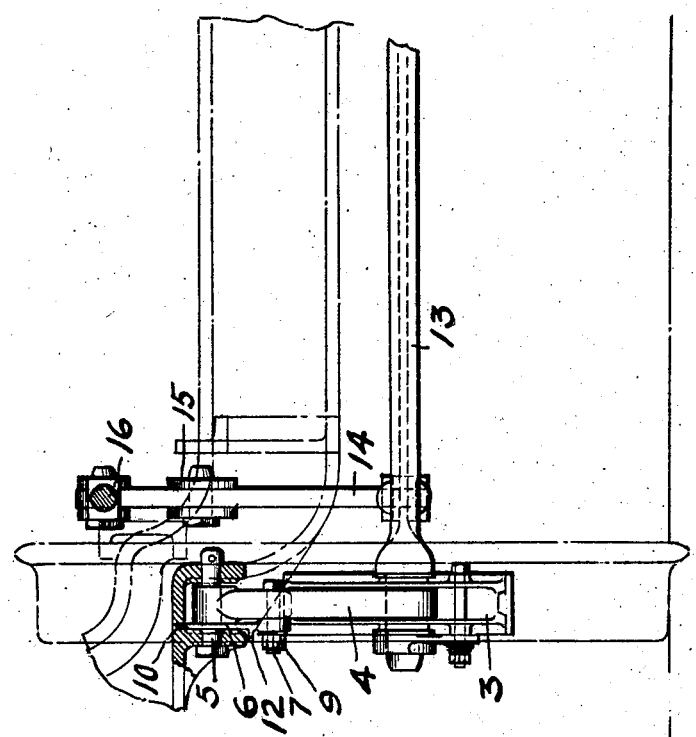
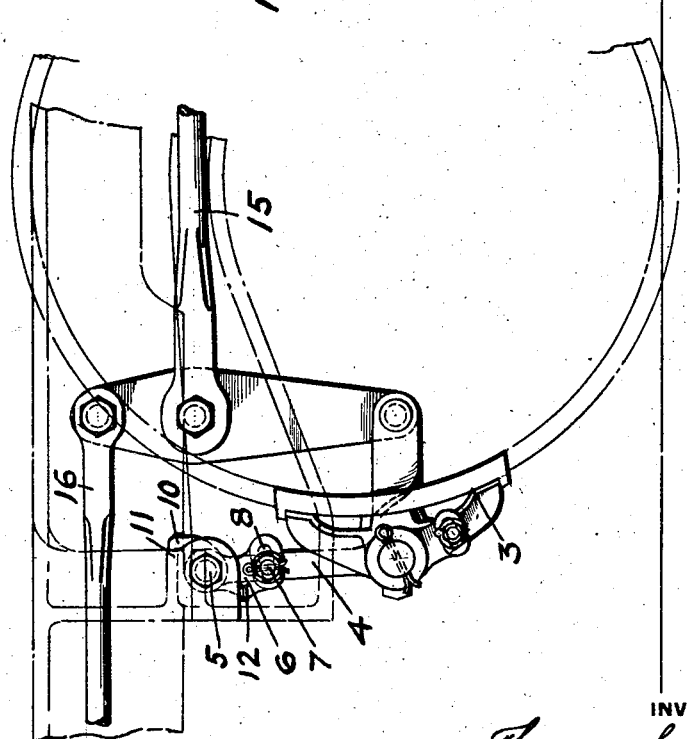
INVENTOR
Thomas L. Burton.
by Edward H. Wright
Atty

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-HANGER.

1,328,315.          Specification of Letters Patent.      Patented Jan. 20, 1920.

Application filed June 12, 1918. Serial No. 239,509.

*To all whom it may concern:*

Be it known that I, THOMAS L. BURTON, a citizen of the United States, residing at St. Louis, in the State of Missouri, have invented a certain new and useful Improvement in Brake-Hangers, of which improvement the following is a specification.

This invention relates to mechanism for suspending brake shoes and has for its primary object to provide an improved and practical means for controlling the release of brake shoes whereby the shoe clearance shall remain practically uniform and constant at all times regardless of the wear of the shoes and of the varying diameter of the wheels.

Generally stated my improvement comprises a movable bracket member normally adapted to move with the brake shoe hanger during the application and release movements of the shoe, but having a yielding or slidable connection with the hanger which permits of a short relative movement therewith when the application movement is lengthened due to wear, there being also stops for limiting the movement of the bracket member in both directions.

In the accompanying drawing Figure 1 is a side elevation of one form of brake suspension embodying my improvement; and Fig. 2, an end elevation of the same.

According to the construction shown the brake shoe 3 is suspended by means of the hanger 4 pivotally attached at its upper end to the truck frame by the pin 5. The bracket member 6, is pivotally mounted on the truck frame, preferably on the same pin 5, with the hanger, and is so connected as to normally move with the hanger during its free application and release movements. This connection comprises the bolt 7, carried by the hanger extending through the slot 8, formed in the bracket member 6, and provided with a spring washer and nut 9, for adjusting the frictional engagement between these parts, whereby a relative sliding movement may occur between said parts when there is an excessive travel of the brake shoe due to wear. The bracket member is provided with a lug or stop 10, adapted to engage a fixed part 11 of the frame for limiting the forward movement of said member when the shoe is being applied to the wheel, and another stop 12 adapted to engage the frame to limit the backward or release movement of the bracket member and hanger. Any suitable or preferred form of brake rigging may be employed for actuating the brake shoes, such as the well known design in which each brake beam 13, is attached to truck levers 14, actuated by pull rods 15, and 16, as will be readily understood.

The brake shoe is shown in the applied position with the extension lug 10 at the top of the bracket member engaging the fixed stop 11. As the shoe wears down or as the wheel is reduced in diameter by turning or wear, it is necessary for the shoe to make an excessive or further movement in coming up against the wheel, and as the stop 10, limits the movement of the bracket member there will be a small yielding or relative sliding movement between the bracket member and hanger such as may be necessary to permit the shoe to bear firmly upon the wheel Then when the brake shoe is released the stop 12, comes in contact with the frame and limits the release movement of the hanger and the clearance of the shoe to the desired amount.

The frictional resistance between the bracket and hanger is so adjusted by the nut 9, as to hold the parts rigidly together during the release movement and at the time of the engagement of the stop 12, but is adapted to be overcome by the force of the application when the stop 10 engages the frame 11, before the shoe is brought against the wheel and permit a relative sliding movement between the bracket and hanger during the further movement of the latter in the application. It will then be seen that this operation results in the automatic adjustment of the bracket relative to the hanger at each application, such as is necessary to compensate for the wear and maintain a uniform and constant amount of clearance at each release movement of the brake shoe.

What I claim is:

1. In a brake device, the combination of a brake hanger pivotally attached to the truck frame, a brake shoe pivotally connected to said hanger, a bracket member also mounted on the frame and having a yielding frictional connection with the hanger, a stop for limiting the release movement of said bracket member, and another stop for limiting the forward movement of said bracket member in application, 2. In a brake device, the combination of a brake hanger pivotally attached to the truck frame, a brake shoe pivotally connected to said hanger, a bracket member mounted on the same pivot with the hanger and having a yielding frictional connection therewith, and stops carried by said bracket member for limiting the movement of said bracket member in both directions.

3. In a brake device, the combination of a brake hanger pivotally attached to the truck frame, a brake shoe pivotally connected to said hanger, a bracket member also mounted on the frame and having a slot, a bolt carried by the hanger and extending through said slot, a nut on said bolt for adjusting the frictional engagement between the bracket member and hanger, and stops carried by said bracket member for limiting the movement of the bracket member.

In testimony whereof I have hereunto set my hand.

THOMAS L. BURTON.